United States Patent
Fell et al.

(10) Patent No.: US 6,282,958 B1
(45) Date of Patent: Sep. 4, 2001

(54) ANGULAR RATE SENSOR

(75) Inventors: Christopher P Fell, Plymouth; Kevin Townsend; Ian D Hopkin, both of Liskeard, all of (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/417,105

(22) Filed: Oct. 13, 1999

Related U.S. Application Data

(63) Continuation of application No. PCT/GB99/02459, filed on Aug. 10, 1999.

(30) Foreign Application Priority Data

Aug. 11, 1998 (GB) .................................................. 9817347

(51) Int. Cl.$^7$ ...................................................... G01P 9/04
(52) U.S. Cl. ........................................................ 73/504.13
(58) Field of Search ........................... 73/504.13, 504.04, 73/504.03, 504.12, 504.14, 504.15, 504.16, 504.02; 310/329, 369

(56) References Cited

U.S. PATENT DOCUMENTS

| 5,450,751 | 9/1995 | Putty | 73/504.18 |
| 5,650,568 | * 7/1997 | Greiff et al. | 73/504.18 |
| 5,915,276 | * 6/1999 | Fell | 73/504.13 |
| 5,932,804 | * 8/1999 | Hopkin et al. | 73/504.13 |

FOREIGN PATENT DOCUMENTS

| 0 461 761 | 12/1991 | (EP) . |
| 0 581 407 | 2/1994 | (EP) . |
| 0 836 073 | 4/1998 | (EP) . |
| 2 275 112 | 8/1994 | (GB) . |
| 2 292 609 | 2/1996 | (GB) . |

* cited by examiner

Primary Examiner—Helen Kwok
(74) Attorney, Agent, or Firm—Nixon & Vanderhye P.C.

(57) ABSTRACT

An angular rate sensor or gyro includes a ring-like resonator (1) mounted by support beams (2) extending from the inner periphery of the ring (1) to a boss (4) on a base (3). The support beams (2) are flexible and allow the resonator (1) to vibrate in response to an electrostatic drive (6, 8) in a substantially undamped oscillation mode to permit the resonator to move relative to the support in response to turning rate. The support beams (2) and resonator (1) are made from crystalline silicon. Electrostatic sensors (7, 9) are provided for sensing movement of the resonator (1). The drive (6, 8) and sensors (7, 9) have plate-like elements made from crystalline silicon having surfaces located substantially normal to the plane of the resonator (1) at a spacing from the adjacent outer periphery of the resonator (1). The ratio of the thickness of the resonator (1) at the outer periphery (1b) to the width of the spacing (11) between the periphery (1b) and the element surfaces (10) is in the range of from 10:1 to 40:1.

9 Claims, 3 Drawing Sheets

ANGULAR RATE SENSOR

This is a continuation of PCT application PCT/GB99/02459, filed Aug. 10, 1999, the entire content of which is hereby incorporated by reference in this application.

BACKGROUND OF THE INVENTION

1. Field of the Invention

This invention relates to an angular rate sensor suitable for sensing motion about at least one axis.

2. Disscussion of Prior Art

Conventional angular rate sensors such as vibrating structure gyroscopes may be constructed using a variety of different vibrating structures. These include beams, tuning forks, cylinders, hemispherical shells and rings. A common feature in all of these structures is that they maintain a resonant carrier mode oscillation. This provides the linear momentum which produces a Coriolis force when the gyroscope is rotated around the appropriate axis. This induced force will produce an oscillatory motion, at the frequency of the carrier mode, along an axis perpendicular to that of the applied rotation and linear momentum. The amplitude of the oscillatory motion will be directly proportional to the applied rate.

The sensitivity of such vibrating structure gyroscopes may be enhanced by designing the vibrating structure, that is, the resonator or vibrating element, such that the Coriolis force directly excites a natural vibration mode of the structure. If the frequency of this response mode exactly matches that of the carrier frequency then the amplitude of the response mode motion will be amplified by the mechanical quality factor, Q, of the structure. Achieving this matching of carrier and response mode frequencies inevitably places tight constraints on the construction tolerances. In practice, it is usually necessary to fine tune the balance of the resonator by adding or removing material at appropriate points around the resonator. This locally adjusts the mass or stiffness parameters thus differentially shifting the mode frequencies.

There are many examples of conventional vibrating structure gyroscopes fabricated using traditional machining techniques. These include a ceramic cylinder vibrating structure gyroscope and Hemispherical Resonator Gyroscope. Recently, advances in micromachining techniques have provided the capability for manufacturing vibrating structures of significantly reduced size and mass and at substantially lower cost. This has in turn opened up new market opportunities for vibrating structure gyroscopes in areas such as car navigation and chassis control systems.

The requirement to balance accurately the carrier and response mode frequencies is equally applicable to micromachined vibrating structure gyroscopes. Lithographic techniques conventionally employed in micromachining fabrication of silicon vibrating structures are capable of achieving extremely high degrees of accuracy in the plane of the silicon wafer. Control of tolerances in the third dimension is not as accurate. Vibrating structures for which the carrier and response mode motion is restricted to that of the wafer plane are therefore most appropriate to exploit the advantages offered by micromachining techniques.

Planar ring vibrating structures or resonators are an example of resonators which are particularly suited for fabrication using micromachining techniques. These are typically excited into a cos2θ resonance mode. For a perfectly symmetric resonator this mode actually exists as a degenerate pair of vibration modes at a mutual angle of 45°. These are shown schematically in FIGS. 1A and 1B in which vibration of the structure is shown about primary axes P and secondary axes S. One of these modes is excited as the carrier mode as shown in FIG. 1A. When the structure is rotated about the axis normal to the plane of the ring (z-axis) Coriolis forces couple energy in to the response mode (FIG. 1B). The amplitude of motion of the response mode will be proportional to the applied rotation rate.

Vibrating structure gyroscopes employing planar ring resonators are described in GB 9703357.5 and U.S. Pat. No. 5,450,751. GB 9703357.5 describes a vibrating structure fabricated from bulk Silicon, incorporating a planar ring resonator externally supported by eight compliant support beams or legs. This gyroscope uses an inductive drive and pick-off method to generate the drive force to excite the resonator into motion and to sense the resultant motion. The gyroscope requires a magnetic circuit to be applied in the region of the ring structure. This design has a number of limitations. For example the magnetic circuit components must be fabricated using standard machining techniques. These are then subsequently assembled in precise alignment to the resonator. The accuracy to which these components can be machined and aligned does not match that achieved by the micromachining processes. The inclusion of these components limits the degree of miniaturization possible with the result that the gyroscope is not suitable for size reduction without significantly degrading the performance.

Additionally certain aspects of the performance of such a gyroscope will be critically dependent upon the characteristics of the magnetic circuit and the magnitude of the B-field. The most significant of these is the scale factor which exhibits a $B^2$ dependence. The B-field will vary significantly over the operational temperature range causing a pronounced scale factor temperature dependence.

The gyroscope described in U.S. Pat. No. 5,450,751 incorporates an electroformed planar metal ring resonator which is driven into resonance electrostatically with the induced motion being capacitively sensed. The drive and pick-off transducers are formed between the outer circumferential edge of the ring and discrete plates positioned concentrically around the ring. This structure has been designed to minimize the natural in-plane frequency whilst maintaining it above any input vibration frequency band. An additional requirement is to maintain the out-of-plane natural frequencies above that of the in-plane. It is desirable to minimize the width of the ring to satisfy both of these requirements. The resultant resonator design uses a structure with a ring width equal to the width of the ring support legs. This gives a structure where the combined stiffness of the legs is high in comparison to that of the ring. This means that the resonant frequency of the structure is predominantly determined by the support legs and mechanical balancing procedures, such as the laser balancing process described in GBA2292609A, cannot be applied.

Balancing of carrier and response mode frequencies is achieved by applying a DC voltage to specific transducer sites. These act as electrostatic springs which differentially shift the mode frequencies. These balancing electrodes occupy locations which could otherwise be used for drive or pick-off sites to maximise the overall device head gain thus improving the noise performance. This balancing technique also requires the use of an additional feedback loop in the control electronics which will itself add noise to the system where large offset voltages are required to balance the modes.

There is thus a requirement for an improved angular rate sensor, preferably with scalefactor performance which is substantially temperature independent, with high drive and pick-off transducer gain, which is capable of being mechanically balanced and which may be produced in small size.

SUMMARY OF THE INVENTION

According to one aspect of the present invention there is provided an angular rate sensor including a substantially planar vibratory resonator having a substantially ring or hoop-like shape structure with inner and outer peripheries extending around a common axis, electrostatic drive means for causing the resonator to vibrate, support means including a plurality of flexible support beams for supporting the resonator and for allowing the resonator to vibrate in response to the electrostatic drive means, in a substantially undamped oscillation mode, such as to permit the resonator to move relative to the support means in response to turning rate, which support beams and resonator are made from crystalline silicon, and electrostatic sensing means for sensing movement of the resonator, which electrostatic drive means and electrostatic sensing means include plate-like elements made from crystalline silicon having surfaces located substantially normal to the plane of the resonator at a spacing from the adjacent outer periphery of the resonator, with the ratio of the thickness of the resonator at said adjacent periphery to the width of the spacing between said resonator periphery and plate-like element surfaces being in the range of from 10:1 to 40:1 to maximise the capacitance between the resonator and plate-like elements and thereby optimizing the drive force on the resonator for a given applied voltage, and to optimise the sensitivity of the electrostatic sensing means.

Preferably the support means also includes a base made from electrically insulating material or from silicon with an insulating oxide surface layer and having a projecting boss, with the inner periphery of the substantially ring or hoop-like structure being coupled to the boss by the support beams which extend from said inner periphery of the ring or hoop-like shape structure to the projecting boss so that the ring or hoop-like shape structure is spaced from the base, with the total stiffness of the support beams being less than that of the ring or hoop-like shape structure.

Conveniently the sensor has eight equi-angularly spaced support beams.

Advantageously the electrostatic drive means includes two electrostatic carrier mode plate-like drive elements for causing the resonator to vibrate in a Cos2θ carrier mode, which carrier mode drive elements are located at 0° and 180° degrees with respect to a fixed reference axis located in the plane of the resonator and two electrostatic response mode plate-like drive elements located at 45° and 225° with respect to said fixed reference axis, and wherein the electrostatic sensing means includes two electrostatic carrier mode plate-like pick-off elements for sensing carrier mode motion of the resonator, which carrier mode pick-off elements are located at 90° and 270° with respect to the fixed reference axis, and two response mode plate-like pick-off elements for sensing motion of the resonator in response to rotation of the sensor about an axis normal to the plane of the resonator, which response mode pick-off elements are located at 135° and 315° with respect to the fixed reference axis.

Preferably the sensor includes means for maintaining the resonator at a fixed DC bias voltage with respect to the electrostatic drive and pick-off means.

Conveniently the sensor includes an electrically grounded screen for enclosing the drive and pick-off means except on the surfaces thereof facing the outer periphery of the resonator and operative to minimize direct capacitive coupling between the drive means and the pick-off means.

Advantageously wherein the base is made from electrically insulating material the sensor includes means for electrically grounding the base.

Preferably the crystalline silicon utilised has a resistivity such that the effective drive means spacing resistance is substantially greater than the support beam resistance.

BRIEF DESCRIPTION OF THE DRAWINGS

For a better understanding of the present invention, and to show how the same may be carried into effect, reference will now be made, by way of example, to the accompanying drawings in which.

DETAILED DISCUSSION OF PREFERRED EMBODIMENTS

Figure 1A:
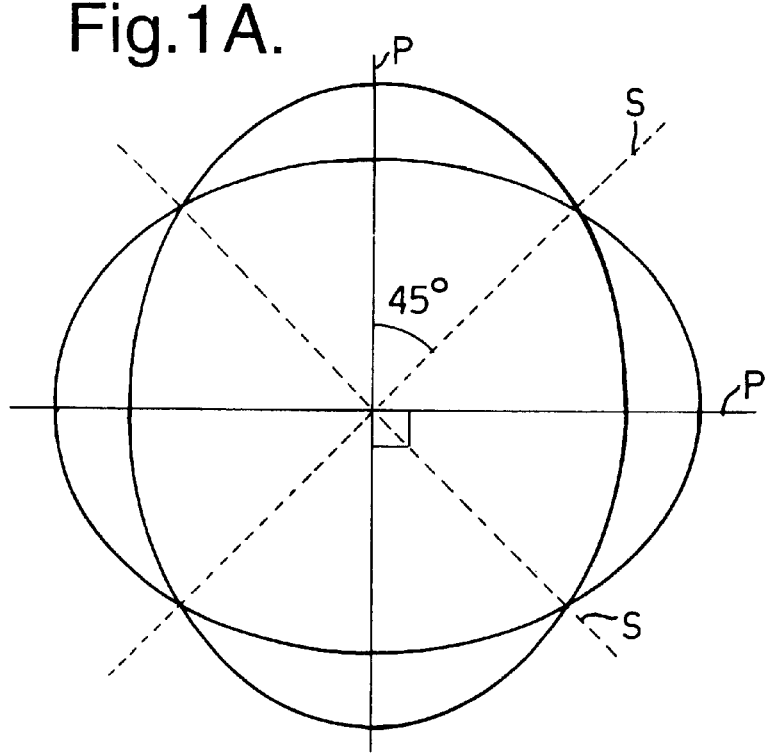
FIGS. 1A and 1B are schematic representations of the Cos2θ vibration pattern for an angular rate sensor according to the present invention for the carrier mode (FIG. 1A) and for the response mode (FIG. 1B), FIG. 2 diagrammatic plan view from above of part of an angular rate sensor according to the present invention showing resonator, support means and drive an pick-off means.
Figure 1B:
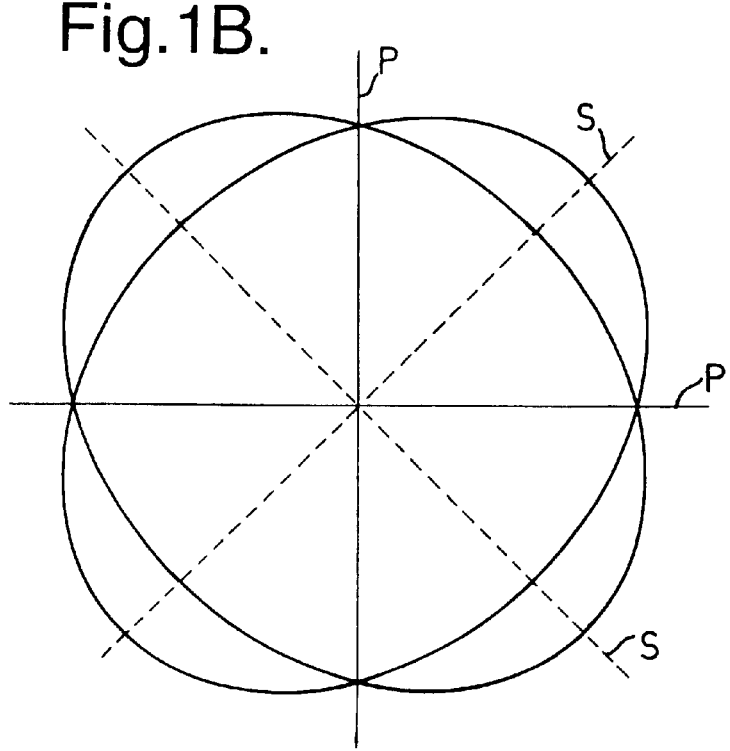
Figure 2:
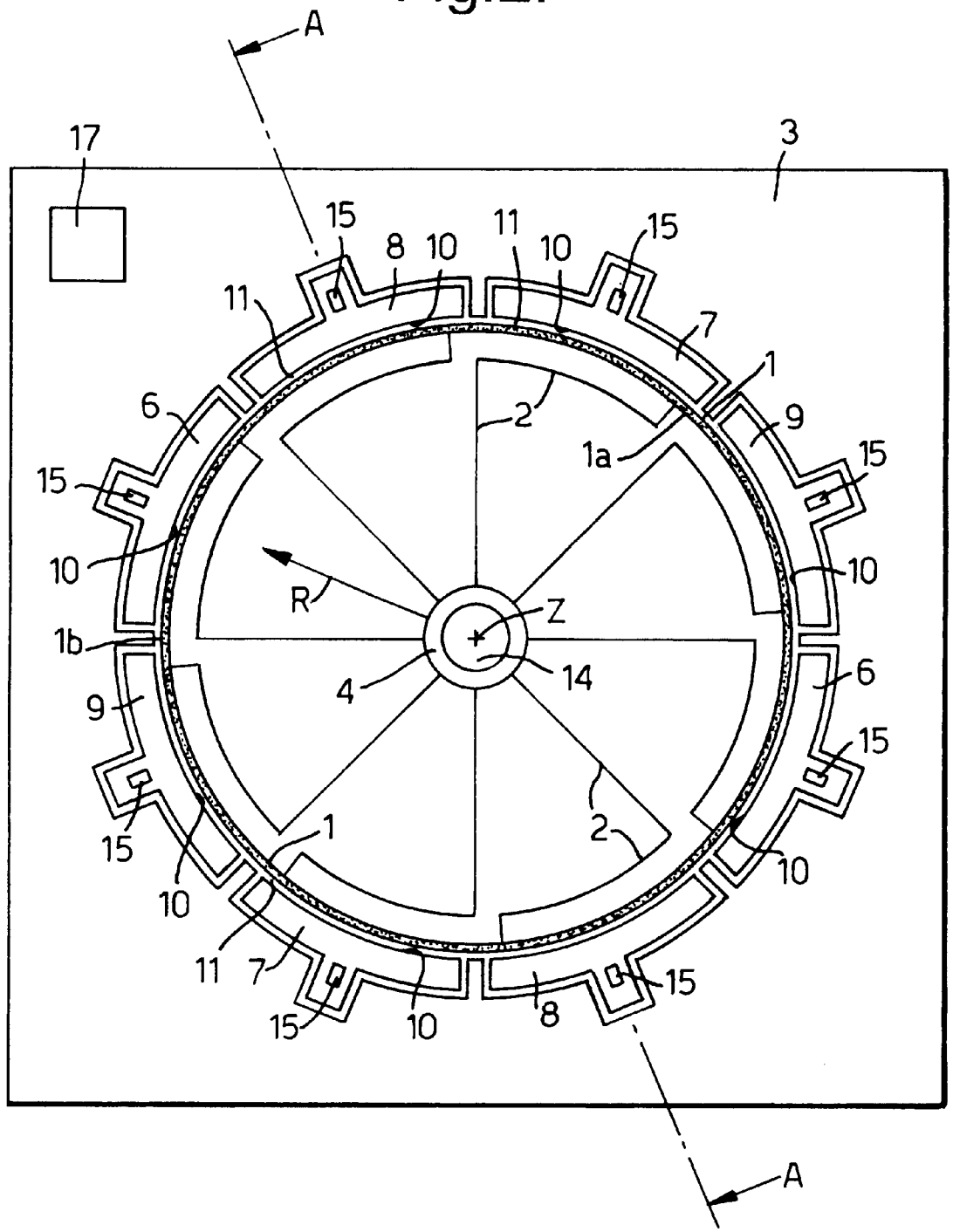
Figure 3:
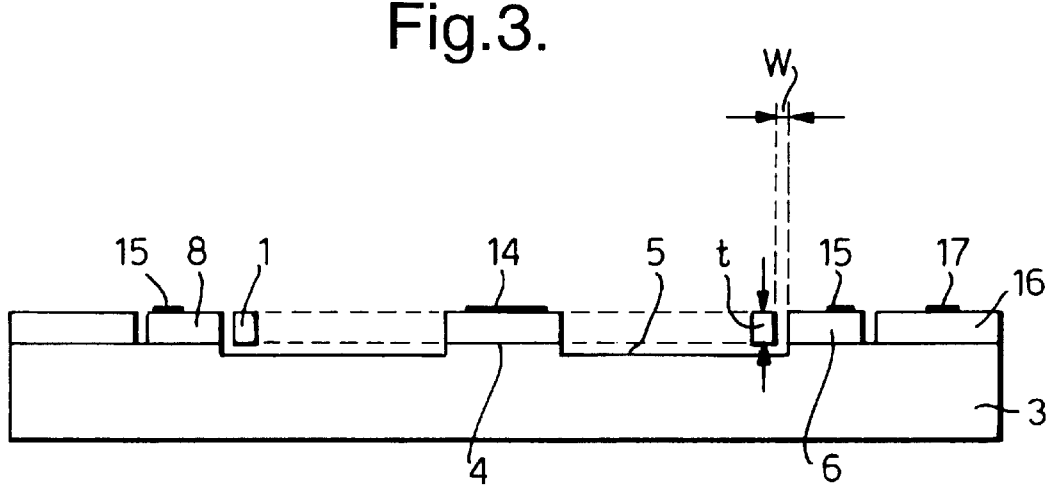
FIG. 3 is a schematic cross sectional view taken on the line A—A in FIG. 2.
Figure 4:
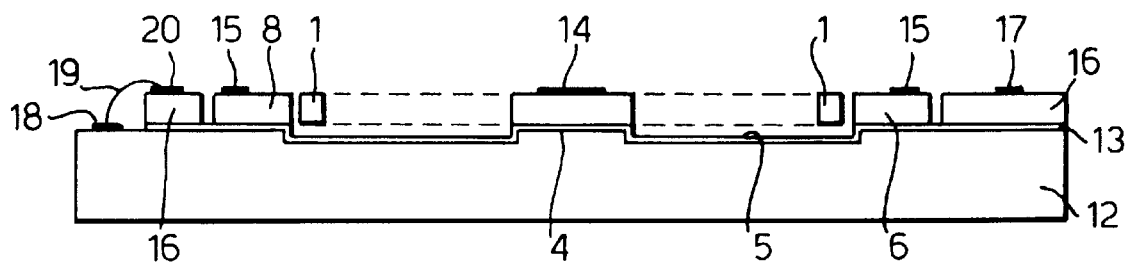
FIG. 4 is a cross sectional view similar to that of FIG. 3 through a sensor according to a second embodiment of the present invention.

An angular rate sensor according to the present invention suitable for use as a vibrating structure gyroscope includes a substantially planar vibrating resonator 1 having a substantially ring or hoop-like shape structure with an inner periphery 1a and an outer periphery 1b. The inner and outer peripheries 1a and 1b extend around a common axis Z as shown in FIG. 2 of the accompanying drawings. The sensor also includes support means which in turn include a plurality of flexible support beams 2 for supporting the resonator 1 and for allowing the resonator 1 to vibrate, when driven, in a substantially undamped oscillation mode such as to permit the resonator 1 to move relative to the support means in response to turning rate. The support means also includes a base 3 made from electrically insulating material and having a projecting boss 4. The base 3 which is made from electrically insulating material has means for electrically grounding it. The inner periphery 1a of the resonator 1 is coupled to the boss 4 by the support beams 2 which extend from the inner periphery 1a to the boss 4 so that the ring or hoop-like shape resonator structure is spaced from the boss 4 as can be seen in FIGS. 3 and 4. The total stiffness of the support beams 2 is less than that of the ring-like resonator 1. In this manner a cavity 5 is provided in the region directly under the ring-like resonator 1 and support beams 2 so that they are freely suspended from the boss 4. In the embodiments of the sensor of the present invention illustrated in FIGS. 2, 3 and 4 of the accompanying drawings, there are 8 equi-angularly spaced support beams 2.

The beams have the effect of point spring masses acting on the resonator at the point of attachment. As such they locally perturb the mode dynamics causing a shift in the resonant frequencies. In order to prevent this introducing an undesirable splitting of the carrier and response mode frequencies the number and position of the legs should be matched to the mode symmetry. When employing Cos2θ modes eight identical beams 2 at an equi-angular separation of 45° are employed. The respective dimensions of the beams 2 and resonator 1 are such that the total stiffness of the beams 2 is significantly less than that of the resonator 1 itself. This ensures that the Cos2θ behaviour is determined predominantly by the resonator characteristics of the ring part of the resonator.

This has two distinct advantages. Firstly, the beam compliance serves to decouple the ring resonator from the base mount giving significantly reduced sensitivity to thermally induced mounting stresses. Secondly, any frequency split present due to manufacturing imperfections may be trimmed out using the mechanical balancing process described in GB 2292609A. This technique involves the removal of mass from the neutral axis of the ring-like resonator 1 and allows for accurate balancing of the carrier and response mode frequencies. This balance will be maintained over the full operating temperature range. This process can only be successfully applied where the resonance behaviour is dominated by the ring-like resonator characteristics. The resonant frequencies of ring structures such as described in U.S. Pat. No. 5,450,751 will be substantially unaffected by this process as the resonance characteristics are predominantly determined by the support leg dimensions.

The resonator structure is excited into resonance at the Cos2θ mode frequency by means of electostatic drive means with the resultant motion detected using electrostatic pick-off means.

The support beams 2 and resonator 1 are made from crystalline silicon and the sensor also includes electrostatic drive means for causing the resonator 1 to vibrate and electrostatic sensing means for sensing movement of the resonator 1. The electrostatic drive means and electrostatic sensing means include plate-like elements 6, 7, 8 and 9 made from crystalline silicon in the form of transducers having surfaces 10 located substantially normal to the plane of the resonator 1 at a spacing 11 from the adjacent outer periphery 1b of the resonator 1.

The electrostatic drive means includes two electrostatic carrier mode plate-like drive elements 6 for causing the resonator 1 to vibrate in a Cos2θ carrier mode, which carrier mode drive elements 6 are located at 0° and 180° with respect to a fixed reference axis R located in the plane of the resonator 1. The reference axis R is taken from the geometric centre of the resonator 1 to the centre point of the one of the carrier mode drive elements 6. The electrostatic drive means also includes two electrostatic response mode plate-like drive elements 8 located at 45° and 225° with respect to the reference axis R.

The electrostatic sensing means includes two electrostatic carrier mode plate-like pick-off elements 7 located at 90° and 270° with respect to the reference axis R and two response mode plate-like pick-off elements 9 for sensing motion of the resonator 1 in response to rotation of the sensor about an axis normal to the plane of the resonator 1, namely the axis Z, which response mode pick-off elements 9 are located at 135° and 315° with respect to the reference axis R.

When the sensor is rotated about the Z axis, Coriolis forces will couple energy into the response mode with an amplitude of motion directly proportional to the applied rate. This motion is detected by the pick-off elements 9. The rate induced motion may be nulled by means of the response mode drive elements 8 to enable the sensor to be operated in a closed loop configuration which is known to give performance advantages. In this mode of operation the nulling force is directly proportional to the applied rate.

As aforesaid the drive and pick-off transducers are identical plate-like elements formed from the crystalline silicon. The plate surface 10 normal to the plane of the resonator 1 forms a capacitor with the facing surface of the adjacent segment of the resonator 1. The plate subtends an angle of 40° with a 5° angular spacing between adjacent transducer elements. The capacitor spacing 11 is maintained at a constant value across the area of the capacitor plates. The transducer sites and central boss 4 of the resonator 1 are rigidly fixed to the supporting base 3 which comprises an electrically insulating material such as glass. A silicon substrate with an insulating surface oxide layer 13 may alternatively be used as shown in FIG. 4.

The resonator structure is maintained at a fixed DC bias voltage with respect to the drive and pick-off elements. The electrical connection from the control circuitry is made, by means of a bond wire (not shown), onto a metal bond pad 14 deposited onto the surface of the resonator structure at the central boss 4. Bond pads 15 are similarly deposited on the upper surface of the drive and pick-off elements.

The ratio of the thickness (t) of the resonator 1 at the outer periphery 1b thereof to the width (w) of the spacing 11 between the resonator periphery 1b and the adjacent plate-like drive or pick-off element surfaces 10 according to the invention must be in the range of from 10:1 to 40:1 to maximise the capacitance between the resonator 1 and elements 6, 7, 8 and 9 and thereby optimise the drive force on the resonator 1 for a given applied voltage and also to optimise the sensitivity of the electrostatic sensing means provided by the elements 7 and 9.

An oscillating voltage, applied to a drive element 6 will generate a drive force, F given by:

$$F = \frac{e_0 A}{d^2} V_{DC} V_p \quad (1)$$

where $V_{DC}$ is the fixed DC offset voltage, $V_p$ is the oscillating voltage applied to the drive element 6 at the resonant frequency ω, d is the capacitor plate separation, A is the capacitor plate area and $\epsilon_0$ is the permittivity of free space. The resonance motion modulates the pick-off element spacing 11 and hence the capacitance. This will generate a current at the pick-off element 7, $1_{PO}$, which is given by:

$$I_{PO} = \frac{e_0 A}{d^2} V_{DC} a\omega \quad (2)$$

where a is the amplitude of motion which is assumed to be small in comparison to the capacitor spacing d. The closed loop scalefactor when using capacitive drive and pick-off transducers is given by:

$$SF = \frac{m\pi d^2}{180} \frac{1}{C_g^2} \frac{V_{ref}}{V_{DC}^5} \quad (3)$$

where m is the modal mass of the resonator 1, $C_g$ is the transducer capacitance and $V_{ref}$ is the fixed voltage reference level of the primary pick-off output (this maintains a constant carrier mode amplitude). As the resonator 1 and elements 6,7,8,9 are all fabricated from the same bulk Silicon wafer the geometry of the overall structure will be very stable as the temperature varies. The voltage levels can also be maintained to a high degree of accuracy and thus the scalefactor will be substantially constant over temperature. This represents a significant improvement over the corresponding situation when employing inductive drives and pick-offs which exhibit a B² dependence.

Direct capacitive coupling of the drive signal onto the pick-off can give rise to a spurious signal output which will appear as a bias error and degrade the sensor performance. In order to minimize this error mechanism an electrically grounded screen 16 is provided which encloses the drive and pick-off elements on all surfaces normal to the plane of the resonator except the surface 10 facing the outer periphery 1b of the resonator 1. This screen 16 is formed from the same Silicon wafer layer as the resonator 1 and transducer plates allowing the drive and pick-off elements to be in close proximity to one another without giving rise to undue pick-up levels. A metal bond pad 17 is deposited on the surface of the screen 16 to enable it to be grounded. The elements are then able to subtend a larger angle which helps to maximise the drive and pick-off element gains.

Parasitic capacitive coupling between the drive and pick-off elements may also occur indirectly where the DC bias offset of the resonator 1 is inadvertently modulated by the applied drive voltage. The magnitude of this modulation is determined by the ratio of the effective drive transducer gap resistance, $R_{gap}$, to that of the bias offset bond pad to ring circumference resistance (n.b. this is dominated by the support beam resistance, $R_{eg}$). This error source may be contained within acceptable limits by selecting silicon wafer material of resistivity such that $R_{gap} \gg R_{eg}$. Alternatively, by depositing metal over the upper surface of the resonator 1 and support beams 2 then silicon of considerably higher resistivity may be used.

The resistivity of the crystalline silicon is such that the effective drive transducer gap resistance, that is the effective drive means spacing resistance, is substantially greater than the support beam resistance.

Where the substrate or base 12 consists of a silicon wafer with an insulating oxide surface layer 13 such as in FIG. 4, an additional parasitic coupling mechanism exists. In order to eliminate capacitive coupling via the silicon under the oxide surface layer, the substrate 12 must additionally be electrically connected to ground. This may be conveniently done in the control circuitry with electrical connection being made directly to the substrate. If the sensor is contained in a grounded metal package this may be conveniently done by means of conductive epoxy applied between the underside of the sensor and the surface of the package. Alternatively, this may be achieved on the device chip by etching an additional hole in the silicon screen layer, through the surface oxide, to expose the substrate surface as shown in FIG. 4. A metal bond pad 18 may then be deposited directly onto the silicon substrate and a wire bond connection 19 made to the screen layer from a bond pad 20.

In order to optimise the achievable drive force for given applied voltages it is desirable to maximise the capacitor plate area and minimise the spacing 11 size (i.e. maximise capacitance). The capacitor area may be increased by increasing the radius and the depth or thickness (t) of the resonator 1. The requirement to maintain the natural mode frequencies above any input vibration range imposes some limitations on these dimensions. For resonator structures, such as described herein, where the resonator 1 is significantly stiffer than the support beams, the lowest frequency resonance will be an out of plane translation of the resonator 1. Increasing the radius of the resonator will lower this mode frequency, however, this may be partially offset by increasing the depth of the structure. Modern Deep Reactive Ion Etch (DRIE) equipment and techniques are capable of etching high quality vertical trenches in silicon to a depth of several hundred microns. This provides the capability of fabricating capacitors with large plate areas. However, maximising the capacitance is also dependent upon reducing the spacing 11.

The sensor dimensions are designed to give the optimum solution to accommodate all of these design requirements. The structure shown in FIG. 2 has a resonator radius of 2 mm with a rim width of 50 $\mu$m. The support beams 2 are 24 $\mu$m wide with the total stiffness of all support beams being significantly less than that of the resonator 1. The capacitor spacings 11 are 10 $\mu$m and thus, with a resonator ring depth or thickness (t) of 100 $\mu$m the aspect ratio of the trench is 10:1. The use of a capacitor spacing of this dimension enables adequate transducer gain to be achieved with low offset voltages on the resonator (~5V). This avoids the need to generate voltages in excess of the supply and facilitates low cost ASIC integration. Using these dimensions a sensor with performance and manufacturing cost commensurate with current high volume automotive requirements can be fabricated.

What is claimed is:

1. An angular rate sensor including a substantially planar vibratory resonator having a substantially ring or hoop-like shape structure with inner and outer peripheries extending around a common axis, electrostatic drive means for causing the resonator to vibrate, support means including a plurality of flexible support beams for supporting the resonator and for allowing the resonator to vibrate in response to the electrostatic drive means, in a substantially undamped oscillation mode such as to permit the resonator to move relative to the support means in response to turning rate, which said support beams and said resonator are made from crystalline silicon, and electrostatic sensing means for sensing movement of the resonator, which said electrostatic drive means and electrostatic sensing means include plate-like elements made from crystalline silicon having surfaces located substantially normal to the plane of the resonator at a spacing from an adjacent outer periphery of the resonator, with a ratio of the thickness of the resonator at said adjacent periphery to a width of the spacing between said resonator periphery and said plate-like element surfaces being in the range of from 10:1 to 40:1 to maximise a capacitance between the resonator and the plate-like elements and thereby optimising a drive force on the resonator for a given applied voltage, and to optimise the sensitivity of the electrostatic sensing means.

2. A sensor according to claim 1, wherein the support means also includes a base made from electrically insulating material or from silicon with an insulating oxide surface layer and having a projecting boss, with an inner periphery of the substantially ring or hoop-like structure being coupled to the boss by the support beams which extend from said inner periphery of the ring or hoop like structure to the projecting boss so that the ring or hoop-like shape structure is spaced from the base, with a total stiffness of the support beams being less than that of the ring or hoop-like shape structure.

3. A sensor according to claim 2, having eight equi-angularly spaced support beams.

4. A sensor according to claim 2, wherein the electrostatic drive means includes two electrostatic carrier mode plate-like drive elements for causing the resonator to vibrate in a Cos2θ carrier mode, which said carrier mode drive elements are located at 0° and 180° degrees with respect to a fixed reference axis located in the plane of the resonator and two electrostatic response mode plate-like drive elements located at 45° and 225° with respect to said fixed reference axis, and wherein the electrostatic sensing means includes two electrostatic carrier mode plate-like pick-off elements for sensing carrier mode motion of the resonator, which said carrier mode pick-off elements are located at 90° and 270° with respect to the fixed reference axis, and two response mode plate-like pick-off elements for sensing motion of the resonator in response to rotation of the sensor about an axis normal to the plane of the resonator, which said response mode pick-off elements are located at 135° and 315° with respect to the fixed reference axis.

5. A sensor according to claim 2, including means for maintaining the resonator at a fixed DC bias voltage with respect to the electrostatic drive and sensing means.

6. A sensor according to claim 2, including an electrically grounded screen for enclosing the drive and sensing means except on the surfaces thereof facing the outer periphery of the resonator and operative to minimise direct capacitive coupling between the drive means and the sensing means.

7. A sensor according to claims 2, wherein the base is made from electrically insulating material and including means for electrically grounding the base.

8. A sensor according to claim 1 wherein the crystalline silicon utilised has a resistivity such that an effective drive means spacing resistance is substantially greater than a support beam resistance.

9. An angular rate sensor comprising:
a substantially planar vibratory resonator having a substantially ring or hoop-like shape structure with inner and outer peripheries extending around a common axis;
an electrostatic drive causing the resonator to vibrate;
a plurality of flexible support beams for supporting the resonator and for allowing the resonator to vibrate in response to the electrostatic drive, in a substantially undamped oscillation mode such as to permit the resonator to move relative to the support in response to turning rate, which said support beams and said resonator are made from crystalline silicon; and
electrostatic sensor sensing movement of the resonator, which said electrostatic drive and electrostatic sensor include plate-like elements made from crystalline silicon having surfaces located substantially normal to the plane of the resonator at a spacing from an adjacent outer periphery of the resonator, with a ratio of the thickness of the resonator at said adjacent periphery to a width of the spacing between said resonator periphery and said plate-like element surfaces being in the range of from 10:1 to 40:1 to maximise a capacitance between the resonator and the plate-like elements and thereby optimising a drive force on the resonator for a given applied voltage, and to optimise the sensitivity of the electrostatic sensor.

* * * * *